US007028224B2

(12) United States Patent
Mitchell

(10) Patent No.: US 7,028,224 B2
(45) Date of Patent: Apr. 11, 2006

(54) NETWORK ROUTER HAVING AN INTERNAL AUTOMATED BACKUP

(75) Inventor: Arthur Devon Mitchell, Loveland, CO (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 10/042,973

(22) Filed: Jan. 9, 2002

(65) Prior Publication Data

US 2003/0131287 A1     Jul. 10, 2003

(51) Int. Cl.
*G06F 11/00* (2006.01)
(52) U.S. Cl. ......................................... 714/43; 370/351
(58) Field of Classification Search .................. 714/43, 714/4, 10–13, 56; 709/239; 370/248, 250, 370/251, 255, 355, 556, 357, 360, 351, 362, 370/216–228; 340/825.01, 2.24
See application file for complete search history.

(56) References Cited

U.S. PATENT DOCUMENTS

| | | | |
|---|---|---|---|
| 5,485,576 A | | 1/1996 | Fee et al. |
| 5,550,816 A | * | 8/1996 | Hardwick et al. ............ 370/397 |
| 5,715,237 A | * | 2/1998 | Akiyoshi ..................... 370/228 |
| 5,771,227 A | * | 6/1998 | Benayoun et al. ........... 370/235 |
| 5,835,696 A | * | 11/1998 | Hess ............................ 714/10 |
| 6,078,963 A | * | 6/2000 | Civanlar et al. ............. 709/238 |
| 6,148,410 A | | 11/2000 | Baskey et al. |
| 6,195,359 B1 | | 2/2001 | Eng et al. |
| 6,266,335 B1 | * | 7/2001 | Bhaskaran ................... 370/399 |
| 6,397,260 B1 | * | 5/2002 | Wils et al. ................... 709/238 |
| 6,490,246 B1 | * | 12/2002 | Fukushima et al. ......... 370/220 |
| 6,876,625 B1 | * | 4/2005 | McAllister et al. .......... 370/221 |
| 2002/0103921 A1 | * | 8/2002 | Nair et al. ................... 709/232 |
| 2003/0101426 A1 | * | 5/2003 | Sarkinen et al. .............. 716/12 |
| 2003/0117950 A1 | * | 6/2003 | Huang ......................... 370/220 |
| 2003/0147408 A1 | * | 8/2003 | Datta et al. .................. 370/401 |
| 2003/0210686 A1 | * | 11/2003 | Terrell et al. ................ 370/389 |

* cited by examiner

*Primary Examiner*—Dieu-Minh Le
(74) *Attorney, Agent, or Firm*—Hoffman, Warnick & D'Alessandro, LLC

(57) ABSTRACT

A network router having an internal automated backup is provided. Specifically, the present invention provides a network router having at least one primary port facility, a switched fabric, and a backup card array. When a router card connected to a primary port facility fails, a failure message is automatically sent to the switched fabric. The switched fabric then disconnects the failed card from the primary port facility and places it in an extended bay. Thereafter, the switched fabric connects a backup router card from the backup card array to the primary port facility. In addition, the primary port facilities under the present invention can include a primary and a secondary processor for more reliable communication.

15 Claims, 3 Drawing Sheets

NETWORK ROUTER HAVING AN INTERNAL AUTOMATED BACKUP

BACKGROUND OF THE INVENTION

1. Field of the Invention

The present invention generally relates to a network router. More particularly, the present invention relates to a network router having an internal automated backup.

2. Background Art

As the use of computer technology in business grows, businesses are increasingly implementing computer networks to provide connectivity throughout the workplace. As these computer networks grow, network applications (e.g., multimedia, voice over IP, etc.) are creating a demand for greater redundancy capabilities of network service providers. In meeting the necessary demands of today's computer networks, reliable routers are required.

Current router technology is well known in the art. A typical router includes ports for channeling communication throughout the network, a primary port facility having a single processor, and a router card for controlling the router ports. Problems arise, however, when a high utilization is communicated through a router. Specifically, when a high volume of information is communicated through the router, the processor often becomes overworked/degraded. This often results in the dropping of information packets (i.e., pieces of the information) from the communication so that the recipient receives only part of the information.

Another problem with current router technology arises when the router card fails. Currently, when a router card fails, communication is switched to a different router port that is controlled by a functioning router card. This method of relieving a failed router card, however, is often unreliable. Alternatively, a failed router card can be manually replaced with a backup router card by a technician. This can be highly inefficient and expensive especially in networks that are dispersed over a large geographic area. Moreover, once inserted, the backup router card must be initialized with routing information so that it can function properly within the router. This can also require the manual services of a technician.

In view of the foregoing, there exists a need for a network router that has an internal automated backup so that a failed router card can be automatically replaced without the intervention of a technician. Moreover, there exists a need for a network router having more than one processor so that packets of information are not dropped from communications. Thus, there exists a need for a network router that provides increased redundancy and automated backup capabilities.

SUMMARY OF THE INVENTION

The present invention overcomes the drawbacks of existing routers by providing a network router having an internal automated backup. Specifically, the router of the present invention includes at least one primary port facility, a switched fabric, and a backup card array. When a router card connected to the primary port facility fails, a failure message is automatically sent to the switched fabric. In response, the switched fabric automatically replaces the failed router card with a backup router card from the array. The failed router card is then placed in an expanded bay for future removal. Each primary port facility of the present invention can also include two processors, a primary and a secondary, for ensuring that packets of information do not get dropped from communication.

According to a first aspect of the present invention, a network router having an internal automated backup is provided. The router comprises: (1) a primary port facility; (2) a card array having at least one backup router card; and (3) a switched fabric, wherein the switched fabric automatically replaces a failed router card connected to the primary port facility with a backup router card from the card array.

According to a second aspect of the present invention, a network router having an internal automated backup is provided. The router comprises: (1) a primary port facility; (2) a card array having at least one backup router card; and (3) a switched fabric for automatically replacing a failed router card connected to the primary port facility with a backup router card from the card array, wherein the switched fabric includes an information system for receiving a failure message from the primary port facility and a switching system for replacing the failed router card with the backup router card.

According to a third aspect of the present invention, a network router having an internal automated backup is provided. The router comprises: (1) a primary port facility having a primary processor and a secondary processor; (2) a card array having backup router cards; and (3) a switched fabric for automatically replacing a failed router card connected to the primary port facility with a backup router card from the card array, wherein the switched fabric includes an information system for receiving a failure message from the primary port facility and a switching system for mechanically replacing the failed router card with the backup router card.

Thus, the present invention provides a network router having an internal automated backup.

BRIEF DESCRIPTION OF THE DRAWINGS

These and other features of this invention will be more readily understood from the following detailed description of the various aspects of the invention taken in conjunction with the accompanying drawings in which.

Figure 1:
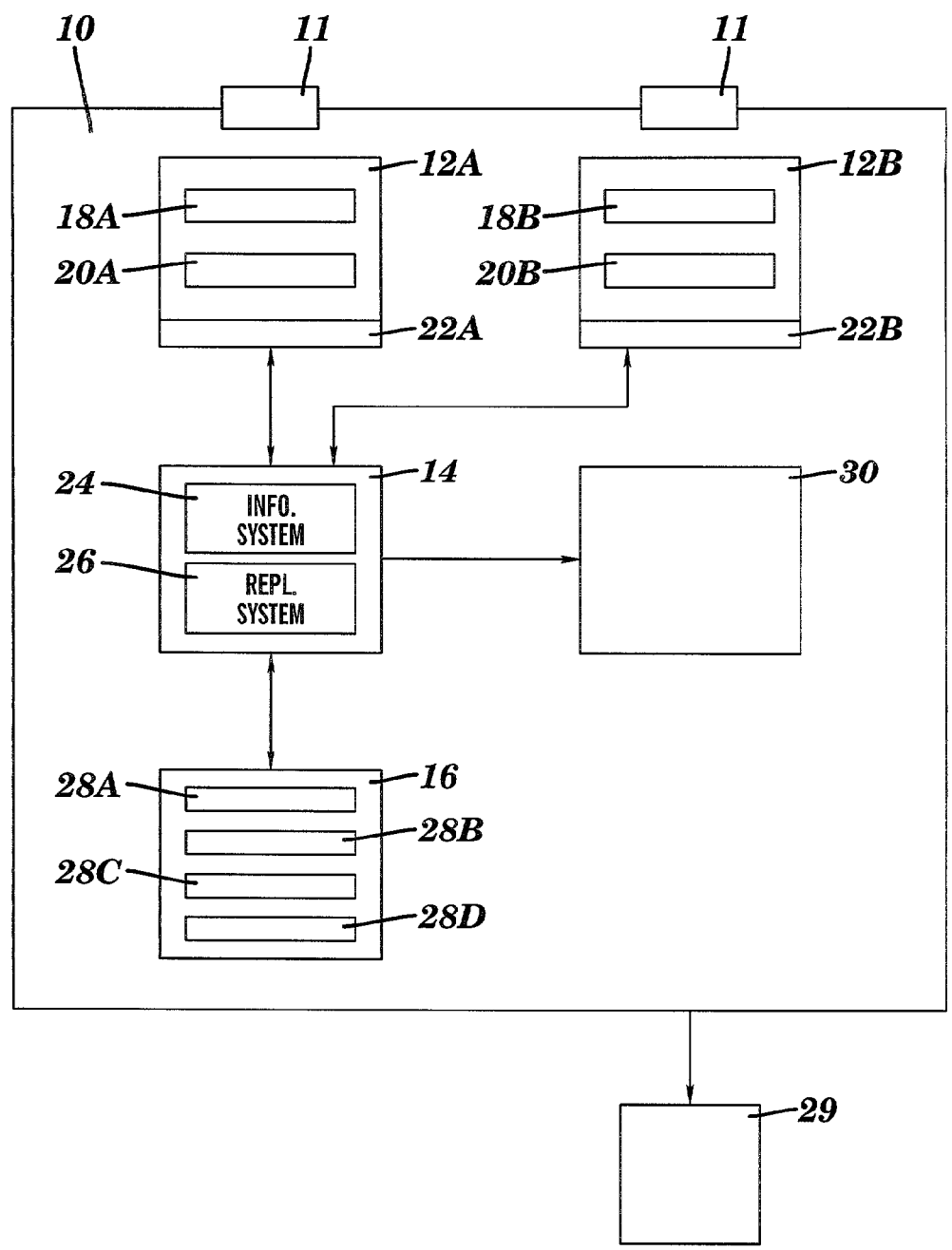
FIG. 1 depicts a box diagram of a network router according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAIL DESCRIPTION OF THE INVENTION

In general, the present invention pertains to a network router having a centralized internal automated backup and a plurality of intelligent primary port facilities. Referring to FIG. 1, an exemplary network router 10 according to the present invention is shown. As shown, router 10 includes ports 11 for channeling communications over a computer network (not shown). Router 10 includes one or more primary port facilities 12A–B for controlling ports 11, switched fabric 14 for replacing failed router cards connected to primary port facilities 12A–B, backup card array 16, and expanded bay 30. It should be understood that routers generally have at least one primary port facility. Two primary port facilities 12A–B are shown in FIG. 1 for illustrative purposes only.

As shown, each primary port facility includes a primary processor 18A–B and a secondary processor 20A–B. Moreover, each primary port facility is connected to a router card 22A–B. The processors in each primary port facility 12A–B control the communications through router 10. As indicated above, current primary port facilities generally include a single processor. This often leads to the dropping of information packets when a high volume information is communicated through the router. Specifically, a high volume of communication often leads to the over-taxing of the single processor. By including two processors, according to the present invention, the overtaxing of a single processor is avoided and the dropping of data packets is prevented. In general, primary processors 18A–B manage the communication through router 10. However, when a high volume of information is being communicated, primary processors 18A–B can switch off with secondary processors 20A–B to ensure that the communication remains intact. This switching between processors can be based upon the volume of information being communicated. For example, if information above a predetermined volume is communicated, the switching between primary processors 18A–B and secondary processors 20A–B can be triggered. Once triggered, communication can be switched back and forth at predetermined time intervals.

As further indicated above, current routers are also faced with the problems of providing redundancy. Specifically, when a router card connected to a primary port facility fails, the replacement of the failed router card is a time consuming and expensive task. The network router 10 of the present invention provides automated backup of the router cards by having switched fabric 14. As shown, switched fabric 14 includes information system 24 and replacement system 26, and is generally a combination of hardware and software implemented using solid-state technology. When a router card 22A connected to primary port facility 12A fails, a failure message is automatically sent from primary port facility 12 to information system 24. Preferably, information system 24 is a combination of hardware and software that fosters communication between primary port facilities 12A–B and backup card array 16. In one embodiment, information system 24 includes a bus (shown in FIGS. 3 and 4) that forms a communication link between the primary port facilities 12A–B and the backup card array 16.

As will be further illustrated below, when a failure message is received by information system 24, replacement system 26 will automatically and mechanically replace the failed router card 22A in primary port facility 12A with a backup router card 28A, 28B, 28C, or 28D from card array 16. The replaced router card 22A will then be placed in expanded bay 30 for future removal/repair. Replacement system 26 is generally implemented using solid state technology and includes a combination of hardware and software (e.g., robotics) similar to an optical storage device. Optionally, upon receipt of a failure message by information system 24, a message can be sent to an outside technician 29. Although an outside technician 29 is not needed to replace a failed router card under the present invention, a message can nevertheless be sent on an informational basis. The message can also inform the technician 29 of the identity of the backup router card used to replace the failed router card 22A as well as the time it took for the replacement to occur.

Figure 2:
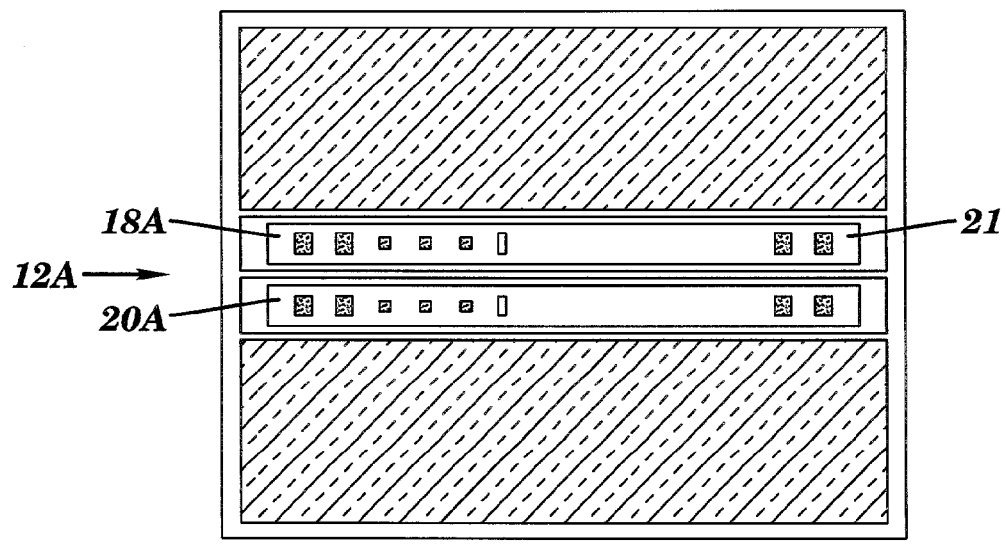
FIG. 2 depicts a primary port facility of the network router of FIG. 1.

Referring now to FIG. 2, primary port facility 12A is shown in greater detail. As depicted, primary port facility 12A includes primary processor 18A and secondary processor 20A. Each processor 18A and 20A, includes male-female connections 21 for connection to a router card (not shown). For example, the connections 21 can be serial port connections. As indicated above, having two processors prevents a single processor from being overtaxed, thus, preventing information packets are not dropped from communications.

Figure 3:
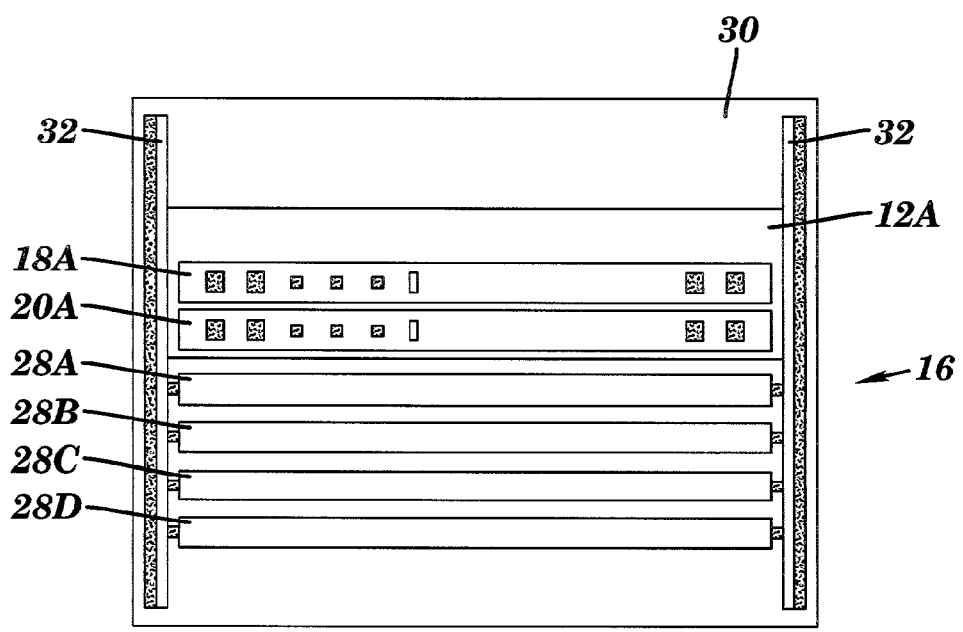
FIG. 3 depicts a backup card array of the network router of FIG. 1.

Referring now to FIG. 3, backup card array 16 is depicted. As shown, backup card array 16 includes backup router cards 28A–D. When a router card connected to primary port facility 12A fails, the failed router card is replaced by one of the backup router cards 28A–D. Also shown in FIG. 3 is bus 32. As indicated above, bus 32 is part of the switched fabric and allows for communications to occur between primary port facility 12A and the backup card array 16. These communications are used for, among other things, providing routing information to the backup router cards 28A–D. This allows the backup router cards to be connected to primary port facility 12A with minimal initialization efforts. Once a failed router card has been replaced, it will be moved to expanded bay 30 for future removal/repair.

Figure 4:
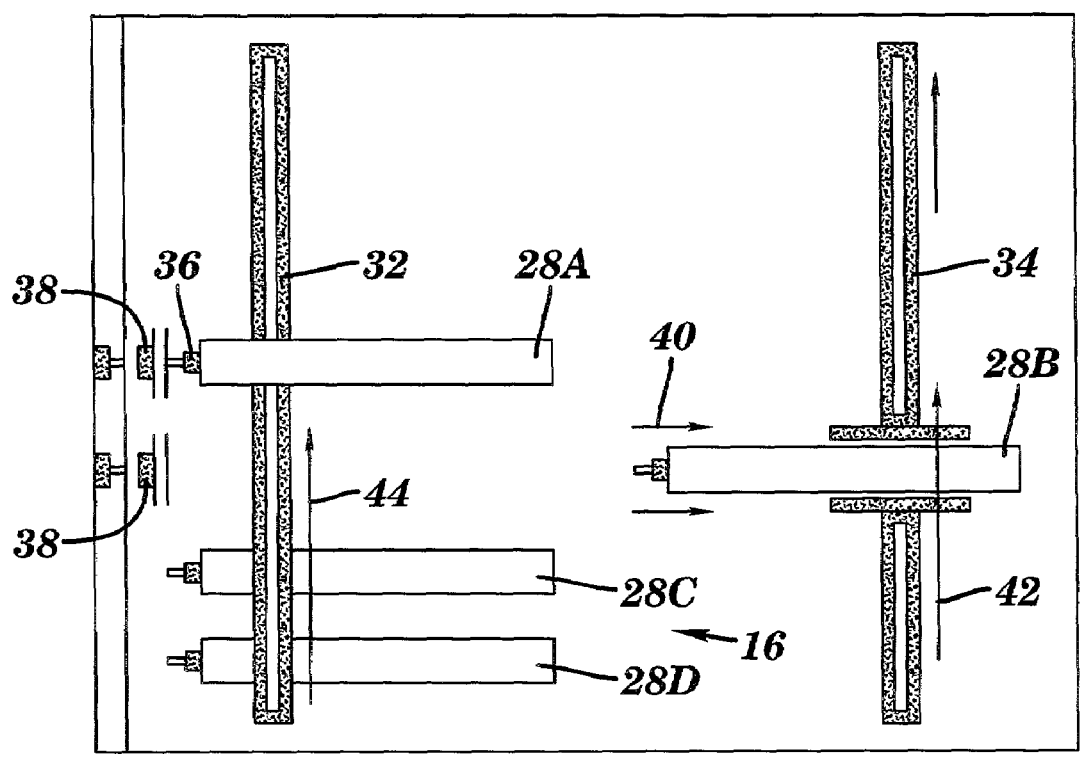
FIG. 4 depicts a switched fabric of the network router of FIG. 1.

Referring now to FIG. 4, a backup router card 28B being moved from backup card array 16 by switched fabric is shown. As indicated above, replacement system of the switched fabric includes a combination of hardware and software (e.g., robotics) necessary to replace a failed router card with a backup router card. Included with this is a replacement mechanism 34, which mechanically disconnects a failed router card from a primary port facility and moves it to the extended bay. Replacement mechanism 34 then mechanically disconnects backup router card 28B from backup card array 16 and connects it to the primary port facility where the failed router card was disconnected. Each backup router card 28D connects to the backup card array 16 and the primary port facilities via male-female connections. As shown, backup router cards 28A–D are equipped with male connections 36 that are received by female connections 38 in backup card array 16. Similar female connections exist on the primary port facilities as shown in FIG. 2 (e.g., serial connection ports 21). Thus, replacement mechanism 34 will engage backup router card 28B and disconnect it from backup card array 16 in the direction shown by arrow 40. The disconnected backup router card 28B will then be moved into position and connected to the primary port facility in the direction shown by arrow 42. Bus 32 is shown in FIG. 4 to further illustrate the communication link between backup router cards 28A–D. As indicated above, bus 32 forms a communication link between the primary port facilities and the router card array.

Thus, the present invention provides a network router having multiple processors for improved reliability, and an internal automated backup for increased redundancy. The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A network router having an internal automated backup, comprising:
    a primary port facility;
    a card array having at least one unutilized backup router card; and
    a switched fabric, wherein the switched fabric automatically replaces a failed router card connected to the primary port facility with an unutilized backup router card from the card arrays, wherein the switched fabric comprises an information system for receiving a failure message from the primary port facility, and a switching system for physically replacing the failed router card with the backup router card in response to the failure message, wherein the switching system includes a replacement mechanism for physically replacing the failed router card with the backup router card, wherein the replacement mechanism physically disconnects the failed router card from the primary port facility, physically moves the failed router card to an expanded bay, physically disconnects the unutilized backup router card from the card array, physically moves the unutilized backup router card from the card array to the primary port facility from which the failed router card was moved, and physically connects the unutilized backup router card to the primary port facility from which the failed router card was moved.

2. The router of claim 1, wherein the primary port facility comprises a primary processor and a secondary processor.

3. The router of claim 1, wherein the primary port facility has serial connection ports for connecting to router cards.

4. The router of claim 1, wherein the information system includes a bus for communicating routing information between the primary port facility and the card array.

5. The router of claim 1, wherein the failed router card is physically moved into an expanded bay by the switched fabric.

6. A network router having an internal automated backup, comprising:
    a primary port facility;
    a card array having at least one unutilized backup router card; and
    a switched fabric for automatically replacing a failed router card connected to the primary port facility with an unutiized backup router card from the card array, wherein the switched fabric includes an information system for receiving a failure message from the primary port facility and a switching system for replacing the failed router card with the unutiized backup router card, wherein the switching system includes a replacement mechanism for physically replacing the failed router card with the backup router card, wherein the replacement mechanism physically disconnects the failed router card from the primary port facility, physically moves the failed router card to an expanded bay, physically disconnects the unutilized backup router card from the card array, physically moves the unutilized backup router card from the card array to the primary port facility from which the failed router card was moved, and physically connects the unutilized backup router card to the primary port facility from which the failed router card was moved.

7. The router of claim 6, wherein the primary port facility includes a primary processor and a secondary processor.

8. The router of claim 6, wherein the switching system includes a replacement mechanism for physically replacing the failed router card with the backup router card.

9. The router of claim 6, wherein the information system includes a bus for communicating routing information between the primary port facility and the card array.

10. The router of claim 6, wherein router cards connect to the primary port facility and the card array via male-female connections.

11. The router of claim 6, wherein the failed router card is physically moved into an expanded bay by the switched fabric.

12. A network router having an internal automated backup, comprising:
    a primary port facility having a primary processor and a secondary processor;
    a card array having unutilized backup router cards; and
    a switched fabric for automatically replacing a failed router card connected to the primary port facility with an unutilized backup router card from the card array, wherein the switched fabric includes an information system for receiving a failure message from the primary port facility and a switching system for physically replacing the failed router card with the unutilized backup router card, wherein the switching system comprises a replacement mechanism that physically connects and disconnects router cards from the primary port facility and the card array, wherein the replacement mechanism physically disconnects the failed router card from the primary port facility, physically moves the failed router card to an expanded bay, physically disconnects the unutilized backup router card from the card array, physically moves the unutilized backup router card from the card array to the primary port facility from which the failed router card was moved, and physically connects the unutilized backup router card to the primary port facility from which the failed router card was moved.

13. The router of claim 12, wherein the router cards connect to the primary port facility and the card array via male-female connections.

14. The router of claim 12, wherein the information system includes a bus that communicates routing information between the primary port facility to the card array.

15. The router of claim 12, wherein the failed router card is physically moved into an expanded bay by the switched fabric.

* * * * *